INVENTOR.
LEO J. BERGER, JR.

Sept. 29, 1964  L. J. BERGER, JR  3,150,525
PRESSURE INDICATING DEVICE
Filed Jan. 31, 1962  2 Sheets-Sheet 2

INVENTOR.
LEO J. BERGER, JR.
BY
ATTORNEY

United States Patent Office 3,150,525
Patented Sept. 29, 1964

3,150,525
PRESSURE INDICATING DEVICE
Leo J. Berger, Jr., Farmington, Mich., assignor to Scans Associates, Inc., Livonia, Mich., a corporation of Michigan
Filed Jan. 31, 1962, Ser. No. 170,109
10 Claims. (Cl. 73—407)

This invention relates to pressure indicating devices used singly or in combination with pressure amplifying devices such, for instance, as devices known in the trade as "differential pressure cells."

Pressure indicating devices or pressure gauges usually include a hand actuated by a pressure sensitive element, such as a diagram responding to the difference of pressure on its respective sides, or a curved hollow member tending to straighten out with the increase of pressure, with such pressure-responsive element being drivingly connected with said hand. The extent or distance through which the hand moves is measured on a graduated scale fixed within the device in such a manner that at atmospheric pressure, or other pressure set to be a starting point, the hand is at zero point, and its travel away from said point indicates the pressure to be read in desired units in which the scale is graduated.

I have found, however, that measurements made from such arbitrarily and rigidly set zero point are very misleading and in many cases result not only in errors in readings but also in improper functioning of the devices operating in response to predetermined pressures. This is particularly true when such pressure indicating devices operate in combination with pressure amplifiers intended to increase the precision of pressure measurements. It should be understood that where such pressure amplifying devices or pressure differential cells amplify a certain pressure and changes therein, they may also correspondingly multiply the changes in the starting or zero pressure.

Changes in a starting or zero pressure may result from changes in temperature within the pressure test chamber, changes in barometric pressure, turbulences within the test pressure chamber and other causes. In cases when the actual or true pressure to be measured comes close to the predetermined pressure limit at which certain functioning of actuated devices occurs, the effect of the change in the starting pressure may cause operation of the pressure-responsive devices uncalled for by the actual pressure, or may cause incorrect reading and an erroneous evaluation. Such results are particularly likely to occur when pressure measurements are repeating, i.e. following one another, as in production testing, and the cycle of measuring and connected operations is very short, such as being measured in seconds.

One such application, in which conventional pressure indicating devices create a number of very serious problems, is in systems for measuring pressure drop or the rate of pressure drop in test chambers or hollow parts for determining the amount or rate of leakage therefrom. Such measurements are made in the use of systems well known in the art for testing various hollow parts for leakage, such as may be caused by porosity of the material, casting flaws, improper welding, insufficient sealing of joints, or faulty workmanship. Such pressure measurements are made at a relatively high rate for the purposes of efficiency of production, with the entire measuring cycle being only a few seconds in duration. Therefore, the pressure within the hollow or cavity of the tested part, at which the measuring cycle begins may not be sufficiently stable, being affected by turbulences, change of temperature of air due to the difference of temperature between the air and the walls of the chamber, changes in atmospheric pressure, changes in altitude, ambient temperature, and similar causes.

One of the objects of the present invention is to provide an improved pressure indicating device which gives pressure readings not from some rigid or unchangeable pressure level but from a starting point which automatically adjusts itself to the point with compensation for mistakes or parasitic influences caused by some of the conditions explained above.

Another object of the invention is to provide an improved pressure indicating device of the foregoing character without introducing other problems or increasing appreciably the costs involved.

A further object of the present invention is to provide an improved pressure indicating device in which measurements are taken by reading on the scale the distance of travel of a hand from another hand, with both of said hands setting themselves at the same point at the beginning of the test or measuring cycle, and with one hand becoming, in effect, locked at the starting point.

A still further object of the present invention is to provide, in a manner of a modification, a pressure indicating system having a floating scale adapted to adjust itself to have its zero mark come to the position corresponding to the actual satrting pressure rather than a certain rigidly predetermined zero point.

A still further object of the invention is to provide an improved pressure indicating device used in combination with pressure amplifiers or differential pressure cells, particularly but not exclusively for the purpose of leakage testing systems, and thereby making it possible to utilize more fully the ability of such amplifiers to permit evaluation of test results to the accuracy of plus-minus .02" of water.

Figure 1:
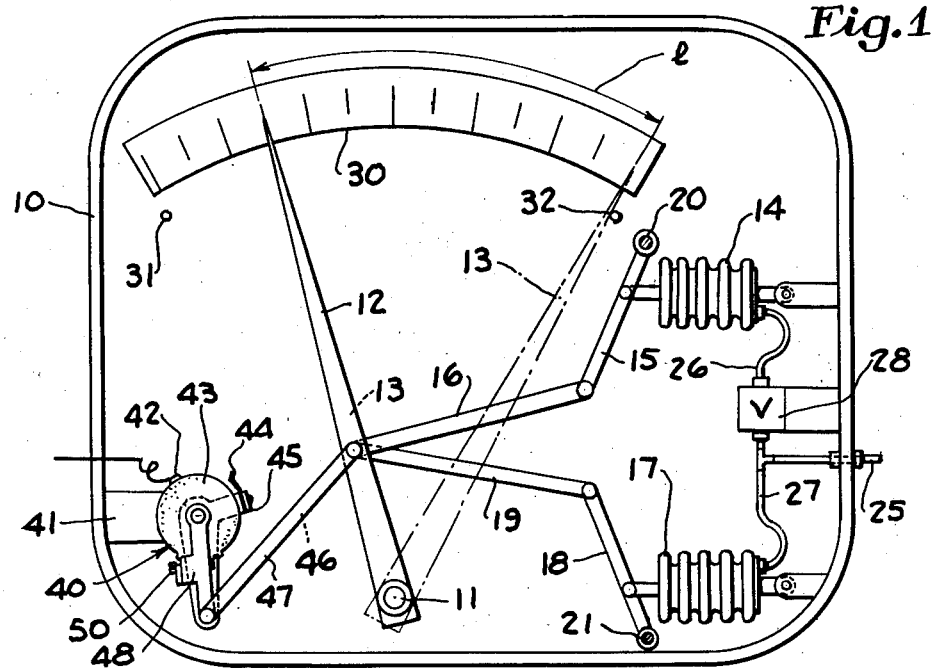
FIG. 1 is a front view of the improved pressure indicating device embodying the present invention, with both the reference pressure indicating hand and the measured pressure indicating hand of the device being set in registry on the mark corresponding to the reference pressure.
Figure 2:
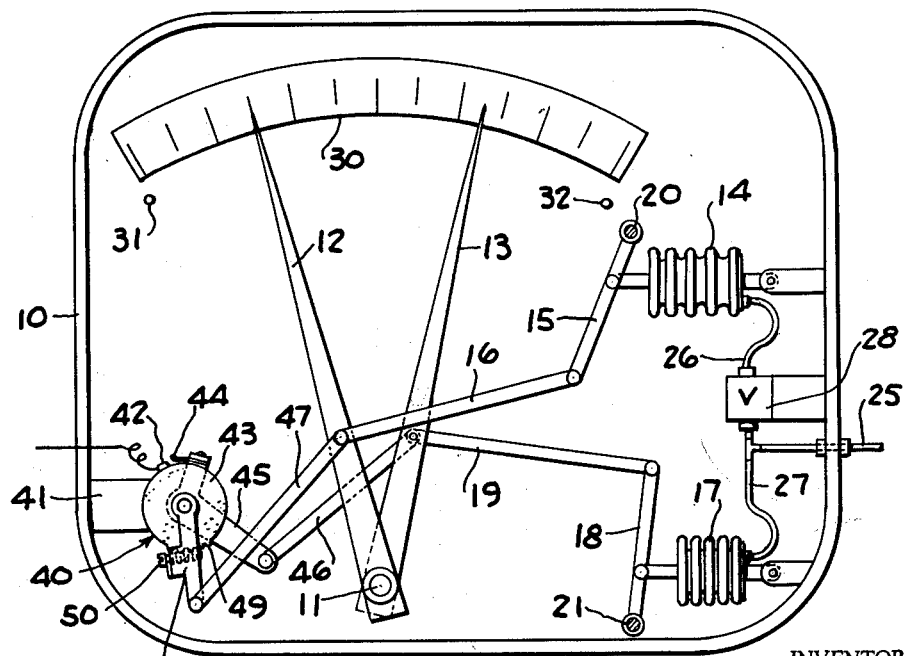
FIG. 2 is a view similar in part to FIG. 1 but showing the reference pressure indicating hand remaining at the mark indicating the reference pressure and with the measured pressure indicating hand in a position at the point indicating the magnitude of the measured pressure.

Referring to the drawings, there are shown therein, by way of example, three embodiments of the present invention. FIGS. 1 and 2 illustrate a pressure indicating device particularly advantageous for use in measuring rates of pressure changes in leakage testing systems. It will be understood, however, that pressure indicating devices shown in said figures, as well as devices of modified constructions embodying the present invention are not limited to such application and may be used for pressure measurements in numerous other applications and under many conditions. Pressure indicating devices embodying the present invention may be used singly or in combination with pressure differential cells or devices amplifying pressure variations for more convenient measurements. Such measurements may be made to determine momentary pressures, i.e. to indicate pressure existing at a certain moment, as well as to determine the rate of pressure changes, such, for instance, as is usually done in leakage testing systems.

In leakage testing systems my improved pressure indicating devices are used in connection with differential pressure cells for the purposes of indicating the rate of leakage in a tested part, such as in an automobile engine cylinder block, or other hollow casting, riveted or welded tanks, and the like. The degree or rate of leakage is usually used as an indication of the quality of castings or of the welded seams, tightness of riveted joints, and even porosity of the metal itself. It should be appreciated that in many instances the leakage is so small and the measuring period is so short (for the purpose of speed of testing in quantity production) that the existing instruments would be unable to give any appreciable indication of change in pressure. Accordingly, the differential pressure cells used in leakage testing systems operate to magnify the pressure drop within the tested part and change the pressure drop to pressure rise for more convenient measuring. In testing, air under pressure is pumped into a test part to a certain predetermined pressure, such as 100 pounds per square inch, whereupon the part is isolated from the source of such pressure and the rate of pressure drop within such part is measured through a predetermined time interval such as 10 seconds. Suppose, for the purpose of example, that it is determined that a pressure drop of one pound per square inch in 10 seconds is the maximum permissible drop, and that should a greater drop be indicated, the part is to be rejected. In conventional instruments used in such leakage testing systems, the pressure indicating devices are so constructed that pressures are measured or read from a starting point which corresponds to the predetermined test pressures intended to be pumped into the tested part, 100 pounds per square inch in the example given.

I have found that such measurements, although commonly used, contain a serious source of error, causing, in many situations, such measurements to be wholly unreliable and a cause of passing defective parts as well as rejecting completely sound parts. I found that the source of such error lies in the fact that under the above described conditions measurements are taken and readings are made not from a starting point which represents a definite and stable pressure, as it is mistakenly presumed to be, but from a point and pressure which may be higher or lower than the presumed pressure. Obviously, a measurement taken from an uncertain or varying starting point is similarly uncertain and, therefore, unreliable.

In the example given, since measurements are taken from the starting point of a presumed 100 pounds per square inch pressure, this pressure may be termed for the purposes of the present invention as the "reference pressure." I have found that changes or uncertainties in such reference pressure may be due to a number of causes, both peculiar to a particular application, as well as independent thereof. For instance, it has been found that in leakage testing systems in pumping the air into the test part to the predetermined pressure such as 100 pounds per square inch, the time required to raise the pressure from 99 lbs. to 100 lbs. may be many times as long as the time required to raise the pressure in such part from 9 lbs. to 10 lbs. Accordingly, in order to save time, the pumping system is set to pump the air not to 100 pounds per square inch pressure but to 102 pounds or an even higher final pressure, cutting off the period of filling towards its end at approximately the moment when the pressure in the tested part is about to reach but has not yet reached the predetermined pressure of 102 pounds, in the expectation that the pressure at the moment of cutting off the pumping means would be approximately 100 pounds. Therefore the actual pressure at which the part is tested is somewhat uncertain and varying. The condition of turbulence due to the flow of air into the part still continues at the instance of starting the test and, therefore, it adds to the above uncertainty. Furthermore, the tested parts may be at a temperature different than the temperature of the air as it reaches the tested part. Usually the temperature of the tested part is considerably lower than that of the air. Consequently, when the part is filled with air which is still moving within the part, the air cools rapidly and its temperature drops, causing a corresponding drop in pressure. Charges in barometric pressure may also affect the pressure indicating instruments and their reading of the presumed 100 pounds reference pressure.

Under the conditions described above, the drop in the reference pressure during the filling and pressure-stabilizing time may be considerable and in some instances may approach one pound per square inch, i.e. the permitted maximum drop due to leakage. In such a situation a perfect test part would be rejected by the system for showing what is presumed to be but actually is not leakage. In order to give a correct result, the reference pressure from which the pressure drop is to be measured should be not 100 pounds per square inch but the actual pressure existing within the test part at the start of the test period. However, since such actual or true reference pressure is varying, its determination in advance is exceedingly difficult, if not actually impossible.

In accordance with the invention, the pressure measurements are taken not from a certain predetermined point related to atmospheric pressure, but from a starting point which corresponds to the actual pressure, whatever it may be at the moment of starting the test, with such starting point being automatically and correctly set by the pressure indicating device at the beginning of each test cycle, i.e. for each tested part.

In accordance with the invention, I make such pressure measurements first by measuring the true pressure existing within the tested parts at the instant of starting the test, retaining such measurement reading on the device, and thereupon making measurements from such starting point or reference pressure. Thus, in my improved method of pressure measurements, I measure or set the reference pressure, in effect, for each test period.

Referring specifically to the drawings, the pressure indicating device with which the above method is practiced in leakage testing systems comprises a suitable casing generally designated by the numeral 10, in which there are hingedly mounted at a hinge point 11 a reference pressure indicating hand 12 and a measured pressure indicating hand 13. Pressure-responsive means, in the present embodiment expansible bellows 14, are drivingly connected with the aid of links 15 and 16 with the hand 12, while second pressure-responsive means, in the present instance also expansible bellows 17, are drivingly connected with the aid of links 18 and 19 with the hand 13. The links 15 and 18 are hingedly mounted at their ends at pivot points 20 and 21, respectively. The respective linkage driving connections of the hands 12 and 13 are so constructed and adjusted that when the bellows 14 and 17 are subjected to the same pressure, the hands 12 and 13 come in a position of registry, such as shown in FIG. 1. The exact point at which the hands 12 and 13 come to registry depends on the pressure to which the bellows 14 and 17 are subjected.

A conduit 25 is connected to the tested part and to the bellows 14 and 17 with the aid of branch conduits 26 and 27, respectively. Within the branch conduit 26 there is operatively interposed a valve 28 adapted to interrupt the communication of the bellows 14 with the conduit 25 and, therefore, with the tested part and the pressure existing therein.

In operation, with the valve 28 being open, the bellows 14 and 17 become subjected to the same pressure, and the hands 12 and 13 come into a position of registry at a point corresponding to such pressure, as shown in FIG. 1. Thus, both the hand 12 and the hand 13 indicate the starting point or the reference or starting pressure. Thereupon, as the valve 28 closes, the reference pressure is retained in the bellows 14, retaining the reference pressure indicating hand 12 in its set position. With the branch conduit 26 and the bellows 14 being air tight, the hand 12 remains in such position for a sufficiently long period of time to complete the test. On the other hand, the bellows 17, being in communication with the tested part through the conduit 25, is subjected to the changes in pressure in said tested part. With such pressure dropping and the bellows 17 contracting, the hand 13 begins to move to the right, usually continuing such movement during the entire test period. The position of the hand 13 at the end of such period indicates the pressure existing at the end of the test period.

Now, the pressure drop within the tested part would be measured by the distance between the hands 12 and 13 rather than by the distance between any arbitrarily set zero or other point and the hand 13. A scale such as the one indicated by the numeral 30 may be provided in the device. It will now be clear, however, that the position of such scale in my improved pressure indicating device is only of relative importance, and its value is primarily in giving a reading in the number of graduations between the hands. Therefore, placing any numerals on the scale beginning with a zero point is undesirable as providing possibilities of confusion. Furthermore, it is desirable to fix the scale in the casing 10 in such a manner that the hands 12 and 13 always operate intermediately of the ends of such scale and do not actually reach the stems 31 and 32. The latter may be provided, in addition to suitable stops on the linkages, merely to prevent the hands 12 and 13 hitting the wall of the casing or other parts of the device and damaging their delicate points.

A switch device generally designated by the numeral 40 is provided and is operatively mounted on the casing 10 with the aid of a suitable bracket, such as 41. A terminal 42 is provided on the disc 43, while a second terminal 44 is carried by a bracket 45 connected through a link 46 to the hand 13. The disc 43 is connected through a link 47 and an adjustment crank 48 with the hand 12. A gear section 49 provided on the disc 43 is engaged by a worm screw 50 carried by the crank 48 and used for the purposes of adjustment.

In FIG. 1 the terminals 42 and 44 are shown open, and the distance between them determines the amount of permissible maximum leakage. The valve 28 is also in the open position for the purposes explained above. After closing the valve 28, which may be done through operation of a timer device such as that shown in FIG. 3, movement of the hand 13 operates to carry the contact 44 toward the contact 42. If the distance $l$ is traveled and the limit position is reached by the hand 13 within a shorter period of time than the set time period controlled by a timer device (which may be operated by a separate electric circuit), the contact 44 will reach the contact 42, this would indicate presence of leakage in excess of said maximum, whereup a visible or audible signal is made to operate, thus indicating that the tested part is defective and should be rejected. On the other hand, if the hand 13 does not reach the limit position within the set time period, which would be the case when the test part is sound and has only permissible leakage, the contacts 42 and 44 do not close, no reject signal is energized, and the part will be accepted. FIG. 2 shows such a condition, it being presumed that said figure illustrates positions of the parts of the device at the moment of expiration of the set test period. As indicated in FIG. 1, to call for rejection of the test part the total travel of the hand 13 within the test period should be 9 or more graduations. In FIG. 2 the hand 13 traveled with such period only 5½ graduations, indicating only permissible leakage and an acceptable part. This concludes one test cycle. To start a test on another part, the same is connected to the system and filled with air under pressure as explained above. Thereupon, the valve 28 is open, with hands 12 and 13 brought to registry, and the timer device again actuated to being another test cycle. For the purposes of operating the valve 28 automatically, i.e. for opening it prior to the start of the test period, in order to bring the hands 12 and 13 in registry, as well as for closing said valve in order to start the test period, automatic means may be provided in the system and controlled electrically. The details of such a leakage testing system are to be disclosed in a separate application.

Figure 3:
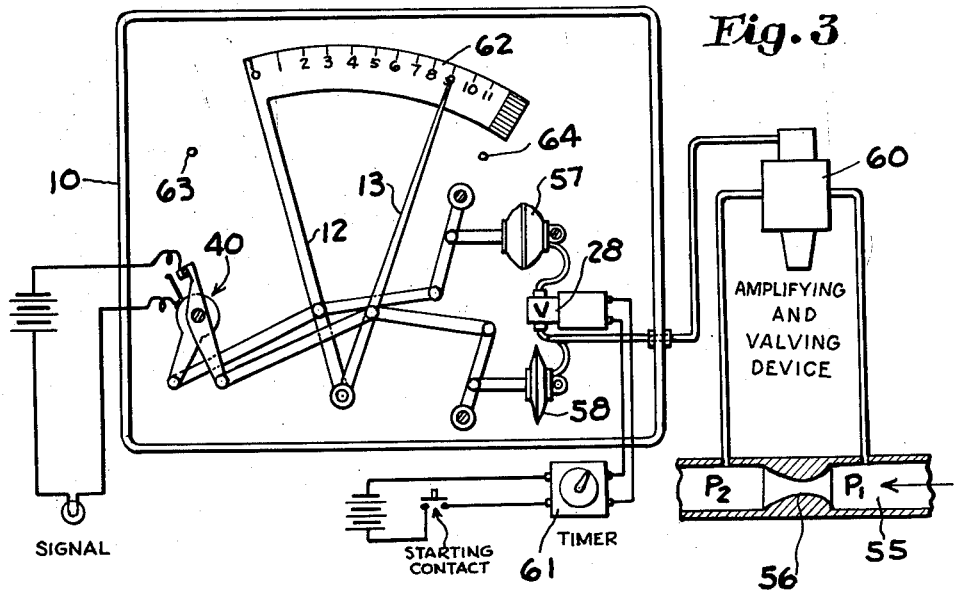
FIG. 3 is a view of a pressure indicating device embodying the present invention in a modified construction and shown in combination with a differential pressure cell and with a timer device for the purposes of measuring the rate of pressure change.

FIG. 3 illustrates my improved pressure indicating device of a modified construction used to measure the rate of liquid flow through a conduit, as well as changes in such rate as may result from a variety of causes such, for instance, as changes in the pressure head or in the size of restriction in the conduit, and the like. In FIG. 3 the conduit is designated by the numeral 55 and is provided with a restriction or orifice 56. Operation of said orifice 56 causes pressure drop from a pressure on its upstream side indicated by the character $P_1$, to a pressure on its downstream side indicated by the character $P_2$. For the purpose of measuring the difference between such pressures, the actual values thereof may be immaterial, while the precise difference between these two values is of importance. Accordingly, the amplifying and valving device 60, being connected to the pressure zones on the opposite sides of the orifice 56 as shown in FIG. 3, operates to give the difference between the pressures existing therein, rather than the value of each of such pressures separately. Devices of this general type are well known in the art and are usually referred to as "differential pressure cells." Such devices usually amplify the difference between the two pressures to which they are exposed. In the device of FIG. 3 the hands 12 and 13 are drivingly connected to two separate pressure-responsive means, in this embodiment diaphragms 57 and 58, through linkages similar to those of the construction of FIGS. 1 and 2. In accordance with the invention the diaphragms 57 and 58 are first subjected to initial difference between the pressures on the opposite sides of the restriction or orifice 56, by opening the valve 28 and thus subjecting said diaphragms 57 and 58 to the same pressure conveyed thereto from the amplifying and valving device 60, and thus setting the hands 12 and 13 in registry at a reference point or mark. Thereupon, the valve 28 is closed for retaining said initial or reference pressure acting on the diaphragm 57, but leaving diaphragm 58 subjected to the pressure conveyed thereto from the amplifying and valving device 60. As the difference between the pressures on the opposite sides of the restriction 56 changes due to a cause such as mentioned above, the pressure conveyed to the diaphragm 58 from the device 60 varies correspondingly, causing the hand 13 to move on the scale 62 to a position indicating at any particular moment the changed valve of the difference between the pressures on the upstream and downstream sides of the restriction 56. In measuring rapidly and repeatedly a pressure differential drop or rise occurring within a predetermined time period, it is desirable to have the duration of such period controlled automatically. Accordingly, a timer mechanism operatively connected with the valve 28 for closing the same automatically after expiration of a predetermined period of time, may be provided.

An important modification in the construction of the pressure indicating device itself is found in eliminating the feature of the device of FIGS. 1 and 2 wherein the graduated scale 30 is fixed to the casing 10 of the device and is graduated preferably without placing numerals thereon, as mentioned. With such a rigidly fixed scale, should the hands 12 and 13 come in registry intermediately of two graduations, and the hand 13 at the end of the test also come to a position between the graduations, precise reading of the distance traveled by the hand 13 may be difficult. In the construction of FIG. 3 such difficulty is eliminated by providing a floating scale 62 carried by the hand 12, with its zero point being at the center line of the hand 12. With such a construction, when the hands 12 and 13 are in registry, the hand 13 will be always at zero on the scale, and, therefore, measurements can be read correctly on the scale 62. It should be noted, however, that the zero position of the scale with respect to the casing may vary within the limits determined by suitable stop means, such as stop stems 63 and 64.

Figure 4:
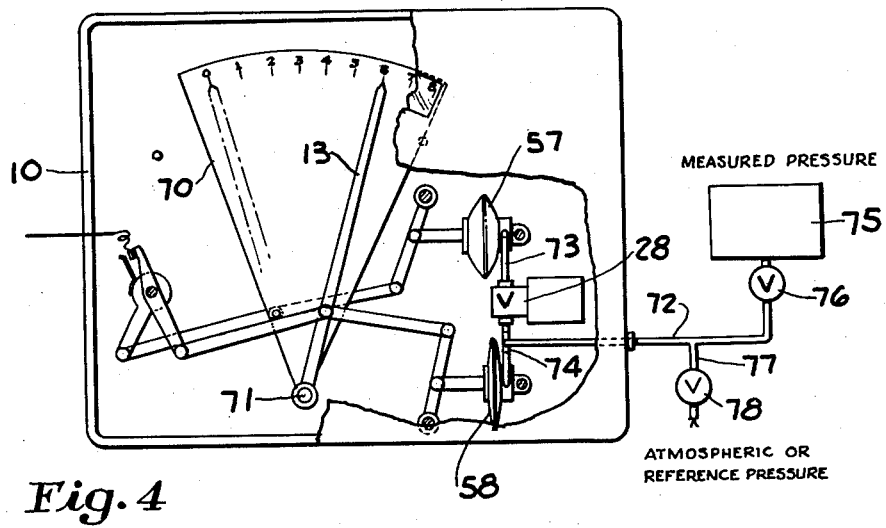
FIG. 4 shows a pressure indicating device embodying the present invention in a still further modified construction.

FIG. 4 illustrates a pressure indicating device in which a hand for indicating the reference pressure is eliminated as such and is substituted by a scale sector 70 hinged at 71 together with but independently of the measured pressure indicating hand 13. The scale sector 70 is actuated by the diaphragm 57 through suitable linkage, while the measured pressure indicating hand 13 is actuated by the diaphragm 58. A conduit 72 having branch conduits 73 and 74 provides a connection between the diaphragms 57 and 58 as well as with the conduit 72. A valve 28 is interposed in the branch conduit 73 to disconnect it from the source of reference pressure. The closed vessel 75 containing pressure to be measured is connected to the conduit 72, with a valve 76 provided at the vessel 75 to disconnect the same from said conduit 72. A branch conduit 77 provided with a valve 78 is connected to the conduit 72. The conduit 77 may be open to the atmosphere or to a source of any desired reference pressure. In the use of the device, the valve 76 is closed and the valves 28 and 78 are open, thus subjecting the diaphragms 57 and 58 to the same pressure and, therefore, bringing the hand 13 to a zero point on the sector scale 70. Thereupon, the valves 78 and 28 are closed, and the valve 76 is open, subjecting the diaphragm 58 to the action of measured pressure within the closed vessel 75 and thus bringing the hand 13 to a position on the scale indicating the intensity of the measured pressure.

In pressure indicating devices having its hand such as 13 hinged at the center of the casing, instead of a scale sector a disc scale may be used.

It will now be seen that in this device the measurements will be read on the scale from the zero point, but with such zero point being, in effect, floating and adjusting itself to the point from which measurements are being taken. Such zero point may approximately correspond to standard atmospheric conditions to which pressure measurements are usually related, or it may be any point above or below atmospheric pressure. But in all cases it will be the actual existing atmospheric or other reference pressure from which measurements are made. By virtue of such expedient the pressure indicating device embodying the present invention provides within itself means which compensate for and eliminate errors in pressure indications and readings caused by various conditions affecting atmospheric or other reference pressures from which measurements are taken as from starting points.

There is thus provided an improved pressure indicating device whereby the objects of the invention listed above and numerous additional advantages are attained.

I claim:

1. In a pressure-indicating device, an indicating member, a reference member providing a reference mark corresponding to reference pressure within a chamber from which pressure indications of measured pressures within said chamber are made by the device, first pressure-responsive means drivingly connected to said indicating member, second pressure-responsive means drivingly connected to said reference member, the respective driving connections of said respective pressure-responsive means adapted when the latter are respectively subjected to equal pressures to set said indicating member on the reference mark, conduit means connecting each of said pressure-responsive means to said chamber to convey the reference pressure existing therein simultaneously to both of said pressure-responsive means in order to set the indicating member on said mark, valve means interposed in said conduit means and operative after the indicating member sets the reference mark to interrupt the communication of said second responsive means with said chamber in order to retain the reference pressure to act on said pressure-responsive means and the reference hand to retain said hand in the position reached, but to leave the second pressure-responsive means and indicating member connected thereto to the action of the pressures within said chamber and responding to the changes of pressure therein.

2. A pressure-indicating device defined in claim 1 and including an electric circuit having a source of electric current, an electric switch interposed in said circuit and operated by said indicating and said reference members; said switch adapted to operate control means for the purposes of the system in which the device is used.

3. A pressure-indicating device defined in claim 1 and adapted for measuring rates of pressure changes, said device including an electric circuit having a source of electric current, an electric switch operated by said indicating member and said reference member, a timer device, and a switch adapted after the indicating member sets on the reference mark to start said timer device.

4. In a pressure-indicating device, an indicating hand, a reference hand adapted to serve as a reference mark corresponding to a reference pressure within a chamber from which pressure measurements of pressure are to be made by the device, first pressure responsive means drivingly connected to said indicating hand, second pressure-responsive means drivingly connected to said reference hand, the respective driving connections between said respective hands and their respective pressure-responsive means being adapted when both of said pressure-responsive means are subjected to equal pressures to set both of said hands in registry with each other, conduit means connecting each of said pressure-responsive means to said chamber, and valve means interposed in said conduit means and operative first to subject both of said pressure-responsive means simultaneously to the reference pressure existing within said chamber in order to cause both of said hands to come into a registry position, and thereupon to isolate the pressure-responsive means of the reference hand from said chamber in order to retain the reference pressure therein to act on said pressure-responsive means and the reference hand, but to have the pressure within said chamber continue to act on the pressure-responsive means of said indicating hand to indicate changes of pressure in said chamber.

5. The pressure-indicating device defined in claim 4, with the pressure-responsive means thereof being in the form of expansible bellows.

6. The pressure-indicating device defined in claim 4 and adapted to be used for measuring rates of pressure changes, said device including an electric circuit having a source of electric current, an electric switch operated by the hands and adapted to set the limit of travel of the indicating hand at which a signal is given, and a timer device to control the maximum test duration.

7. The pressure indicating device defined in claim 4 and including a strip of material of distinctive appearance carried by the reference hand and extending through the range of travel of the indicating hand for evaluating the distance of travel of the indicating hand from the reference hand.

8. The pressure-indicating device defined in claim 4 and including a graduated scale carried by the reference hand and extending through the maximum expected range of travel of the indicating hand for measuring the distance of travel of the indicating hand from the reference hand.

9. In a pressure-indicating device, an indicating hand, a floating graduated scale having a starting mark provided thereon, pressure-responsive means drivingly connected to said hand and to said scale, respectively, and adapted to bring at the start of the pressure-measuring operation said hand to the starting mark on said scale, and means retaining the floating scale in its set position during the pressure measuring operation.

10. In a pressure-indicating device, an indicating member, a reference member providing a reference mark corresponding to the reference pressure within a pressure zone from which pressure indications of measured pressure are made by the device, first pressure-responsive means drivingly connected to said indicating member and second pressure-responsive means drivingly connected to said reference member, the respective driving connections of said respective pressure-responsive means being adapted to set the indicating member on said reference mark when both of said responsive means are subjected to the same pressure, conduit means connecting both of said pressure-responsive means with said pressure zone and adapted to subject both of said pressure-responsive means simultaneously to the reference pressure existing within said pressure zone for setting said indicating member on the reference mark, and means adapted to retain said reference member in the position it assumed when both of said pressure-responsive means were subjected to the same pressure, while the first pressure-responsive means retain communication with said pressure zone and respond to the pressures therein.

References Cited in the file of this patent

UNITED STATES PATENTS

| | | |
|---|---|---|
| 1,172,087 | Westcott | Feb. 15, 1916 |
| 2,232,840 | Claffey | Feb. 25, 1941 |
| 2,467,767 | Mertler | Apr. 19, 1949 |
| 2,696,114 | Cummings | Dec. 7, 1954 |

FOREIGN PATENTS

| | | |
|---|---|---|
| 17,116 | Great Britain | Mar. 4, 1909 |

UNITED STATES PATENT OFFICE
CERTIFICATE OF CORRECTION

Patent No. 3,150,525 September 29, 1964

Leo J. Berger, Jr.

It is certified that error appears in the above identified patent and that said Letters Patent are hereby corrected as shown below:

Column 4, line 48, cancel "second". Column 8, line 5, "and" should read -- member --; line 6, "second" should read -- first --.

Signed and sealed this 17th day of March 1970.

(SEAL)
Attest:

Edward M. Fletcher, Jr.  WILLIAM E. SCHUYLER, JR.
Attesting Officer  Commissioner of Patents